United States Patent [19]

Fougere

[11] E Re. 28,827

[45] Reissued May 25, 1976

[54] METHOD AND APPARATUS FOR COIN DISCRIMINATION UTILIZING A COIN IMPELLER

[75] Inventor: Guy L. Fougere, Lincoln, Mass.

[73] Assignee: Mars, Inc., McLean, Va.

[22] Filed: Dec. 10, 1973

[21] Appl. No.: 423,214

Related U.S. Patent Documents

Reissue of:

[64] Patent No.: 3,757,918
Issued: Sept. 11, 1973
Appl. No.: 269,129
Filed: July 5, 1972

U.S. Applications:

[63] Continuation-in-part of Ser. No. 120,652, March 3, 1971, Pat. No. 3,701,405, which is a continuation-in-part of ser. No. 858,351, Sept. 16, 1969, abandoned.

[52] U.S. Cl. ..... 194/101; 133/3 R; 209/115; 209/111.8

[51] Int. Cl.[2] ..... G07F 3/02

[58] Field of Search ..... 194/97, 100 R, 100 A, 194/101; 209/115, 120, 111.8; 133/3 R

[56] References Cited

UNITED STATES PATENTS

| | | | |
|---|---|---|---|
| 463,305 | 11/1891 | Hoffman | 209/115 X |
| 695,080 | 3/1902 | Ramspeck | 194/101 |
| 2,160,751 | 5/1939 | Mills | 194/100 R |
| 2,349,214 | 5/1944 | Vieth | 194/101 |

FOREIGN PATENTS OR APPLICATIONS

| | | |
|---|---|---|
| 50,111 | 4/1935 | Denmark |
| 22,891 | 12/1967 | Japan |

*Primary Examiner*—Robert B. Reeves
*Assistant Examiner*—Thomas E. Kocovsky
*Attorney, Agent, or Firm*—Davis, Hoxie, Faithfull & Hapgood

[57] ABSTRACT

A method of coin discrimination and a coin discriminator are disclosed which utilize a coin impeller, the impeller comprising magnetic field means for accelerating each coin to a velocity primarily dependent upon the coin's characteristics of electrical conductivity and density, for discriminating among coins based upon the trajectory of the accelerated coin.

23 Claims, 3 Drawing Figures

METHOD AND APPARATUS FOR COIN DISCRIMINATION UTILIZING A COIN IMPELLER

Figure 1:
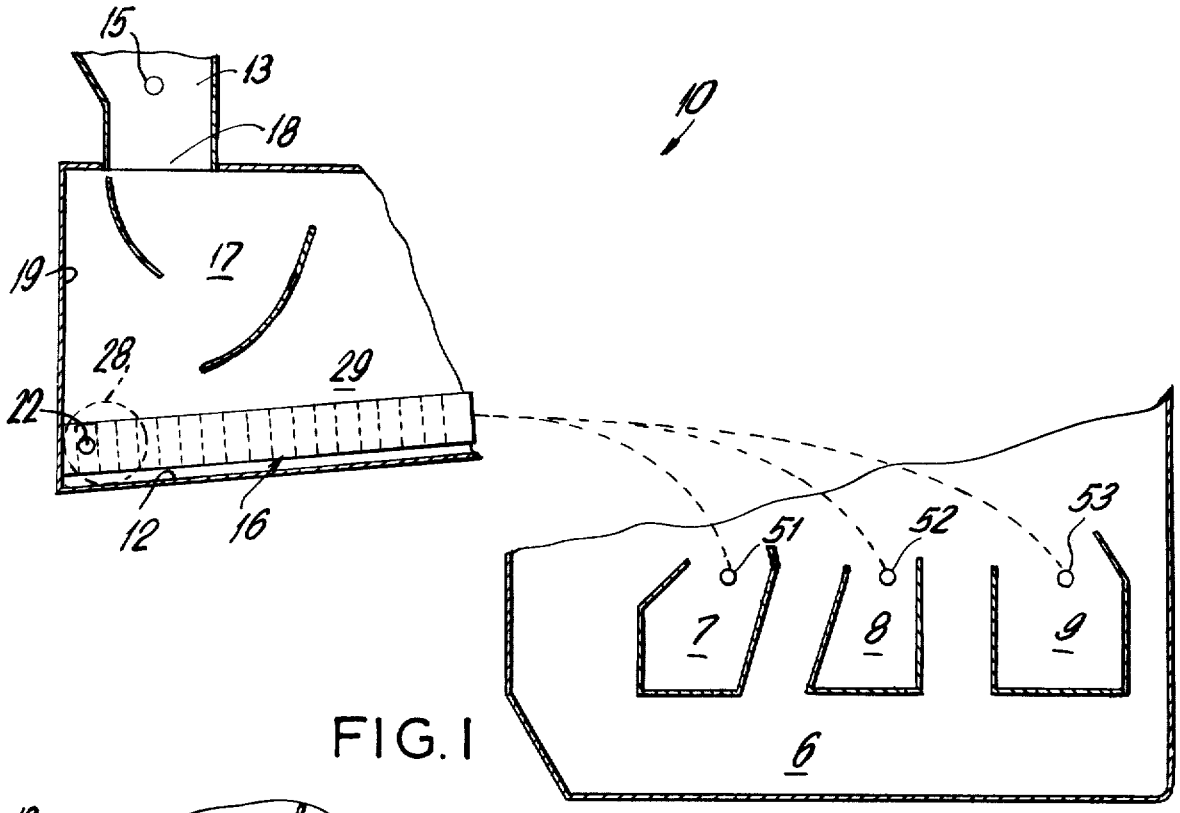

Matter enclosed in heavy brackets [ ] appears in the original patent but forms no part of this reissue specification; matter printed in italics indicates the additions made by reissue.

This is a continuation-in-part of Pat. application, Ser. No. 120,652 now U.S. Pat. No. 3,701,405, filed Mar. 3, 1971, which is a continuation-in-part of application, Ser. No. 858,351, filed Sept. 16, 1969, now abandoned.

This invention relates to a method and apparatus which discriminate between coins according to their authenticity and denomination and, more particularly, relates to the use of a moving magnetic field to impel coins in a coin discriminator.

The coin discriminator of this invention accelerates coins of different denominations to a final velocity dependent upon the coin's characteristics, making it relatively simple to authenticate and sort coins accurately by spacial separation of different coins. Since the motion given to the coin through the coin discriminator system is effected primarily by the coin impeller, rather than by gravity, higher final velocities and more rapid sorting can be obtained. Reliability and effectiveness of the coin discriminator of this invention is high because of the minimal variation in velocity of coins of the same denomination, on the order of ± 2 percent. The coin impeller is capable of accelerating coins at several times the acceleration of gravity, thereby providing the potential for much more rapid coin sorting than is possible in devices which [ relay ] *rely* upon acceleration of the coins by gravity.

In the case of non-ferromagnetic coins, which include a majority of the coins of the world, the magnetic field of the impeller of this invention accelerates a coin to a velocity primarily dependent upon its characteristic acceptance ratio, i.e.: its electrical conductivity divided by its density. The coin's velocity after leaving the magnetic field is determinative of the coin's trajectory and is dependent upon that acceptance ratio.

A number of commercial coin discriminators distinguish authentic coins by their trajectory after the coin has been accelerated by the force of gravity and then declerated or deflected by the interaction of a stationary magnetic field with the coin. Such devices, however, are not satisfactory for high speed sorting of coins, as the velocity of authentic coins in such devices is limited by the acceleration due to gravity and is further limited by the interaction with permanent magnetic fields.

Accordingly, it is one objective of this invention to provide a coin discriminator and method of coin discrimination utilizing a magnetic impeller of coins in order to substantially improve the speed, reliability and effectiveness of coin discrimination.

Another objective of this invention is to provide a coin sorter which is unaffected by the initial velocity imparted to a coin entering the coin sorter, which is relatively independent of coin wear, and which is less likely to be impeded by a bent coin.

A further objective of this invention is to provide a coin sorter capable of high speed coin sorting.

Figure 2:
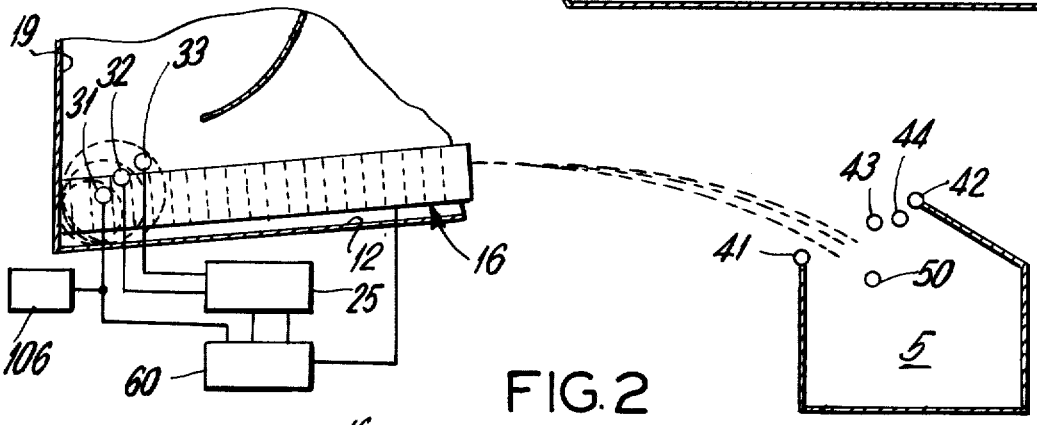
Figure 3:
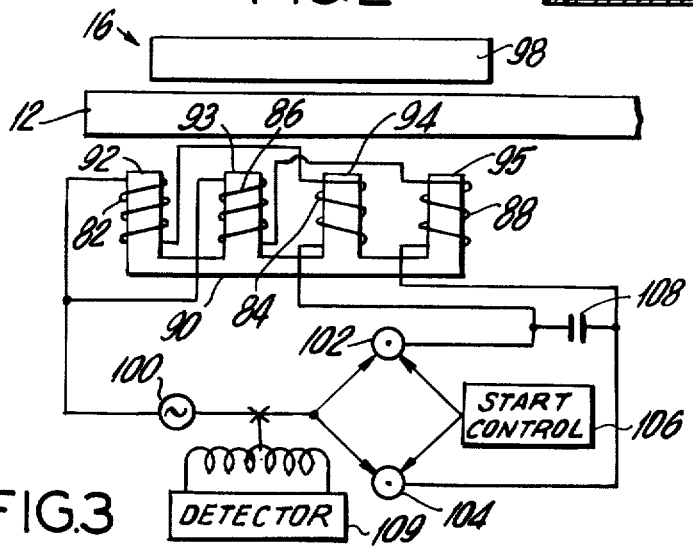

In the drawings:

FIG. 1 is a side view schematic of a first embodiment of the present invention, FIG. 2 is a side view schematic in elevation of a second embodiment of the present invention, and FIG. 3 is a top view schematic of a linear stator impeller appropriate for either embodiment.

Other apparatus utilizing the trajectories of impelled coins to discriminate between coins are shown and described in my application. Ser. No. 120,652, now U.S. Pat. No. 3,701,405, of which this is a continuation-in-part.

Throughout this specification and in the appended claims, the term "coin" is intended to mean genuine coins, tokens, counterfeit coins, slugs, washers, and any other item which may be used by persons in an attempt to use coin-operated devices. By "denomination" I [ means ] *mean* to include all coins of a country having the same monetary value which have substantially the same characteristics such as size, density, electrical conductivity and magnetic permeability.

With reference to FIG. 1, there is illustrated, in schematic form, a coin sorter 10 for electrically conductive coins comprising, in part, a coin support track 12, a coin impeller 16, means 22 for sensing coin arrival, coin receiving bins or receptacles 7, 8, and 9, and reject bin 6. Associated with the coin sorter 10, is a coin receiving hopper 13 and a coin feed path or conduit 17 for conducting coins one after another to the track 12. The upper end 18 of the conduit is an aperture large enough to admit the largest denomination of coin to be sorted. The admitted coins then fall down the conduit 17 and fall onto the track 12 adjacent the starting end of impeller 16. As the coin approaches the coin impeller 16, it passes an arrival sensing device 22 which senses the presence of a coin in the system. While many sensing devices are suitable, such as microswitches, inductive switches or a radiation source and detector, a preferred sensor is a photoelectric device such as a photocell operating in combination with a light source. The presence of a coin is sensed when a coin is between the light source and photocell. The signal from the photocell indicating coin presence is used to start the impeller 16.

The coin 28, illustrated by the phantom lines, reaches the coin support track 12 where it is brought into proximity with the coin impeller 16. The track 12 forms the bottom of coin passageway 29 and serves as a support for the coin 28.

The impeller 16 illustrated in FIG. 1 is of the linear stator variety in which a magnetic field linearly progresses along the length of the impeller at a rate determined by the frequency of the applied current and the geometry of the impeller's pole structure. Suitable coin impellers are described in my application, Ser. No. 120,652, now U.S. Pat. No. 3,701,405, and are only briefly described below. An electrically conductive coin moving with respect to a magnetic field has an induced magnetic field due to eddy currents. The induced field reacts with the linear impeller field to accelerate the coin along the passageway. The coin accelerates along the passageway 29 to a velocity dependent upon the acceptance ratio of the coin and the relationship between the chordal dimensions of the coin and the impeller geometry. The coin's magnetic susceptibility is also a factor affecting velocity. That velocity determines the coin's trajectory through space after it leaves the end of track 12. Since all coins of one denomination will have substantially identical trajectories, they are received at the mouth of the particular acceptor bin 7, 8, or 9 for that denomination. All other coins or objects which are not acceptable coins do not have appropriate trajectories for receipt by any of the bins and so fall outside bin mouths. They are received in a reject bin 6 for retention or return as is appropriate. Sensors 51–53 signal the arrival of acceptable coins. Their signals can be processed to yield totals, make change, initiate a product vend, or produce other output reactions upon receipt of the desired amount.

The foregoing described embodiment although structurally simple is capable of high speed sorting with great accuracy of coin acceptance and denomination discrimination. With a linear magnetic impeller having an active region about 5 inches long, coin accelerations in excess of 12g can be produced. It is apparent that accelerating coins from the track swiftly clears the track for the next coin. Consequently, coins are easily sorted as fast as they can be gravity fed. With special feeding techniques, sort rates in excess of 6,000 coins per minute could be obtained. Plural gravity feeds delivering coins in cyclic sequence or additional magnetic impellers arranged as branches of a tree can be employed to increase the input capability above that of a single gravity feed path to more nearly match the output capability for even greater sort rates. Vibratory input feed paths assist in smooth coin flow.

Impeller excitation supply frequencies higher than the normal 60 $H_z$ can be employed for higher velocities. The impeller can be operated at selective levels of drive to speed up the sorting of lower conductivity slower moving coins such as nickels. Since each nonferromagnetic coin denomination will yield a different trajectory, the coins of any monetary system can be separated by providing appropriately located acceptor bins.

The degree of discrimination of authentic coins depends upon the tolerance allowed to the trajectory path. The mouths of the acceptor bins are dimensioned to accept authentic coins with a small clearance, but to interfere with coins too large to be authentic or coins whose trajectory differs from the normal trajectory for an authentic coin. The mouths of the acceptors constitute "acceptance windows." Acceptance windows can be located anywhere along the trajectory and can be in the form of a dimensioned aperture, accurately spaced pins, or the like. Since the deviation of authentic coins from the average or normal trajectory for that denomination is on the order of ±2 percent, a close clearance in the acceptance window can be employed to reject doubtful coins. The reliability of rejection of nonauthentic coins is extremely high with relatively close clearance in the acceptance window.

FIG. 2 is directed to a further embodiment of the present invention. A group of sensors 31, 32 and 33 is associated with simple logic circuitry to make an initial preliminary tentative determination or classification of coin denomination based on a chordal dimension of the coin. Initial denomination determination is accomplished by occluding one or more of the sensors 31, 32 and 33 which may be photocells operating in cooperation with light sources (not shown). The sensors lie at an angle between the coin track 12 and the end wall 19 and each is positioned such as to be just occluded by the coin having the smallest acceptable diameter of one of the respective permissible denomination diameters when the coin touches both the track 12 [ and the ] and the end wall 19. One or more of sensors 31, 32, and 33 is also used as a presence sensor to detect the arrival of a coin. The sensors examine the diameter of the coin and the logic circuitry determines which one of the preselected permissible coin denominations the coin is large enough to be.

A plurality of acceptance windows can be established, e.g.: by one of retractable pins or the like, on a plurality of trajectories; however, I will described in detail apparatus having one or more acceptance windows at a single location.

A pair of spaced pins are selected in response to that tentative determination from a group comprising either fixed pins 41 and 42 or the fixed mouth of a receptacle, and solenoid actuated retractable pins 43 and 44. The pins selected are arranged to establish an acceptance window of an appropriate dimension through which the trajectory of an acceptable coin passes. Unacceptable coins possess trajectories or diameters which cause such coins to hit the pins and bounce to be rejected. The spacing of acceptance window pins is arranged to provide just enough clearance to reliably accept authentic coins and reject unacceptable coins.

The appropriate acceptance window retractable pin 43 or 44 is selected, based on the preliminary denomination determination, and the impeller 16 is then electrically driven at level selected as a function of this initial determination. The levels of impeller drive are selected, e.g.: by selection of frequency or of current amplitude to choose the rate of change and strength of its magnetic field, to impart the velocity to the coin if it is authentic which will cause it to pass through the acceptance window for that initially determined denomination. If the coin is authentic and is of the denomination initially determined, [ it ] *its* trajectory path will clear the selected pair of pins of the group 41–44 and it will pass freely into a receiving bin 5 where it may actuate a sensor 50 to produce an output signal indicating the receipt of an acceptable coin. Thus, the initial denomination determination based on [ chodal ] *chordal* dimension is verified and the coin accepted.

To insure uniformity of final velocity, the impeller 16 can be driven in reverse briefly, impelling the coin against the end wall 19, before being driven in the forward coin accelerating direction. This initial impeller reversal tends to eliminate bounce or gravity induced initial velocity and insures that all coins start from zero velocity at the starting end of the track.

The operation of the apparatus shown in FIG. 2 is best described by reference to a three denomination set of coins such as the United States 5-cent, 10-cent and 25-cent coins. The sensors 31, 32, and 33, shown in FIG. 2, are located so as to be just obscured by 10-cent, 5-cent and 25-cent coins respectively. These three are the permissible denominations of this example. Sensor 31 is used as a coin presence sensor since any permissible coin will obscure it. Sensor 31 is connected to impeller start control 106 and the impeller drive level selector 60. Sensors 32 and 33 are connected to a logic circuit 25 whose outputs determine which if any of pins 43 and 44 are to be retracted and also are inputs to the impeller drive level selector 60.

If the coin obscures all three sensors 31–33, logic 25 initially determines that the coin is probably a 25-cent piece and retracts both pins 43 and 44 to provide a 25-cent piece sized acceptance window between fixed pins 41 and 42. Logic circuit 25 also provides a signal representative of a 25-cent piece to impeller drive level selector 60. Selector 60 yields a power output level for driving the impeller 16 at a level appropriate for a 25-cent piece. Assuming that the coin is an authentic 25-cent coin, and thus is potentially acceptable, the impeller will impart the proper velocity to the coin to cause it to pass freely between fixed pins 41 and 42 and to enter the bin 5 and activate sensor 50.

Referring now to FIG. 3 there is illustrated, for use in connection with the above described first and second embodiments, a stationary linear impeller means for producing a traveling magnetic field. A linear motor is similar to a stator of a conventional two phase cylindrical electric motor which has been slit along a radial plane and flattened. As is illustrated in FIG. 3, such an impeller 16 comprises two series of coils, a first series including coils 82 and 84 and a second series including coils 86 and 88. While only two coils per series are illustrated, a greater number of coils per series is preferred, particularly for the embodiment which is to be driven at various levels. The coils are wound around a low carbon steel impeller core 90 having projecting pole pieces or core fingers 92–95 spaced longitudinally along the desired direction of coin travel. A magnetic shunt or return path 98 is placed at the side of the coin track 12 opposite the impeller 16 to minimize the overall magnetic reluctance. The magnetic shunt may be made of a low carbon steel plate. It is desirable in the case of high flux densities that the core 90 be laminated steel.

In order to produce the effect of a traveling magnetic field, it is necessary for adjacent fields to have a phase shift relationship. FIG. 3 illustrates a circuit which is suitable for providing approximately a 90° phase shift between adjacent pole pieces 92–95. It can be seen that the first series of coils 82, 84 is wound in alternating fashion, in other words, coil 82 is wound in a counter-clockwise direction about pole 92 while coil 84 is wound clockwise about pole 94. The second series of coils 86, 88 similarly is wound in alternating fashion, namely coil 86 is wound counter-clockwise about pole 93 while coil 88 is wound clockwise about pole 95.

Either the first series or the second series of coils can be individually selectively connected directly to a source of cyclically varying current, for example, chopped D.C. or single phase sinusoidal A.C. current source 100, such as by AND gate 102 and AND gate 104 respectively, which are controlled by signals from start control circuit 106. In the case where single phase sinusoidal AC current is used, the two series are connected in parallel through a capacitor 108 thus placing the capacitor in series with the coil series not directly gated on. The capacitor 108 provides a 90° phase shift between the two series of coils. Because of the reversed direction of windings of adjacent coils within a series and the phase shift between the coil series provided by the capacitor 108, the magnetic field effectively travels in one direction. For example, at one instant of time assuming the polarity of the first coil 82 is north, the polarity of [ clil ] *coil* 86 is north plus 90° the polarity of coil 84 is south and the polarity of coil 88 is south plus 90°. The thrust direction of impeller 80 is reversed by merely enabling the presently disabled AND gate and vice versa. This permits reversal of thrust direction for the uniform coin starting condition purposes described above.

To provide consistent coin velocities, it is preferable to activate the impeller 16 each time at the same point in the supply current wave form. In this way the resultant coin velocity is not dependent upon the particular moment of time when the coin is first exposed to the magnetic field of the impeller. The zero crossing detector 109 is designed to detect the zero crossing of the impeller current in the direction providing desired initial polarity. The zero crossing detector 109 includes a saturation amplifier, a diode, a differentiator to select the desired direction of transition, and a latching relay operated by the output of the differentiator.

I claim:

[ 1. A method of determining the acceptability of coins comprising the steps of generating a traveling magnetic field, directing a coin to the magnetic field so that the force of the field impels the coin projecting it in a desired direction and accepting the coin only if if has a trajectory characteristic of a desired coin. ]

2. The method of claim [ 1 ] *3* wherein desired coins are sorted in accordance with their characteristic trajectories.

3. The method of [ claim 1 ] *determining the acceptability of coins comprising the steps of generating a traveling magnetic field, directing a coin to a coin support track in the magnetic field so that the force of the field impels the coin along the coin support track projecting it in a desired direction and accepting the coin only if it has a trajectory after it leaves the coin support track characteristic of a desired coin*, further comprising the step of making a preliminary classification of the coin and wherein as a result of that classification a value of a characteristic of the magnetic field is selected.

4. The method of claim 3 wherein the preliminary classification is the result of an examination of chordal dimension.

5. The method of claim 3 wherein the rate of change of the magnetic field is selected.

6. The method of claim 3 wherein the strength of magnetic field is selected.

7. The method of claim 3 wherein the characteristic is selected to project all acceptable coins through one or more acceptance windows at a single location.

8. The method of claim 2 further comprising the [ steps ] *step* of [ making a preliminary classification of the coin and as a result of the classification ] establishing an acceptance window *as a result of the classification* on the trajectory of the desired coins of that classification.

9. The method of claim 8 wherein the preliminary classification is the result of an examination of chordal dimension.

10. The method of [ claim 1 ] *determining the acceptability of coins comprising the steps of generating a traveling magnetic field, directing a coin to a coin support track in the magnetic field so that the force of the field impels the coin along the coin support track projecting it in a desired direction and accepting the coin only if it has a trajectory after it leaves the coin support track characteristic of a desired coin*, further comprising the steps of initially causing the magnetic field to travel in a direction *along the coin support track* opposed to the direction of coin projection, stopping the coin and causing the field to travel in the direction of coin projection.

11. The method of claim 10 further comprising the steps of making a preliminary classification of the coin while the coin is stopped and as a result of that examination selecting a predetermined impelling force of the magnetic field.

12. The method of claim 10 further comprising the steps of making a preliminary classification of the coin while the coin is stopped and as a result of that classification establishing an acceptance window on the trajectory of the desired coins of that classification.

[ 13. Apparatus for determining the acceptability of coins comprising traveling magnetic field producing means arranged to impel a coin and thereby project it into a trajectory, means for directing a coin to the magnetic field and means defining an acceptance window on the trajectory characteristic of a desired coin.]

[ 14. The apparatus of claim 13 further comprising a coin support from which coins are projected. ]

[ 15. The apparatus of claim 14 further comprising means defining a plurality of acceptance windows, each on a trajectory characteristic of a desired coin. ]

16. The apparatus of [ claim 14 ] *for determining the acceptability of coins comprising a coin support track for supporting a coin on its edge, traveling magnetic field producing means arranged to impel a coin along the coin support track and thereby project it from the coin support track into a trajectory, means for directing a coin to the magnetic field and means defining an acceptance window on the trajectory characteristic of a desired coin*, further comprising means for making a preliminary classification of the coin and producing a signal indicative of the classification and means responsive to the signal for selecting a value of a characteristic of the magnetic field.

17. The apparatus of claim 16 wherein the means for making the preliminary classification comprises a chordal dimension sensor.

18. The apparatus of claim 16 wherein the value selecting means comprises means for selection of the rate of change of the magnetic field.

19. The apparatus of claim 16 wherein the value selecting means comprises means for selecting the magnitude of the power supplied to the field producing means.

20. The apparatus of claim 17 wherein the value selecting means comprises means for selection of the rate of change of the magnetic field.

21. The apparatus of claim 17 wherein the value selecting means comprises means for selection of the magnitude of power supplied to the field producing means.

22. The apparatus of claim 16 wherein the value selection means are arranged to select a value of a characteristic of the magnetic field such that at least two varieties of desired coins are projected on trajectories passing through one or more acceptance windows at a single location.

23. The apparatus of claim [ 14 ] *16* wherein the means for producing a traveling magnetic field is a linear impeller.

24. The apparatus of claim 23 further comprising a source of alternating current, start control means for connecting the current source to the linear impeller, and a zero-crossing detector connected to monitor the current source and connected to enable the start control means.

25. The apparatus [ of claim 14 ] *for determining the acceptability of coins comprising a coin support track for supporting a coin on its edge, traveling magnetic field producing means arranged to impel a coin along the coin support track and thereby project it from the coin support track into a trajectory, means for directing a coin to the magnetic field and means defining an acceptance window on the trajectory characteristic of a desired coin*, further comprising means for causing the magnetic field to travel in either of two opposed directions along the coin support track and a coin stop in the direction of travel opposed to the direction of projection.

26. The method of claim 25 further comprising at least one chordal dimension sensor adjacent the coin stop.

27. The apparatus of claim [ 14 ] *16* in which the means defining an acceptance window comprises at least one movable barrier in the region into which coins are projected and means for moving the barrier *responsive to an initial denomination determination.*

* * * * *

UNITED STATES PATENT AND TRADEMARK OFFICE

CERTIFICATE OF CORRECTION

PATENT NO. : Re 28,827

DATED : May 25, 1976

INVENTOR(S) : GUY L. FOUGERE

It is certified that error appears in the above-identified patent and that said Letters Patent are hereby corrected as shown below:

Col. 7, line 17 (Claim 16), Delete "The" and "of" and change "apparatus" to --Apparatus--.

Col. 8, lines 31-32 (Claim 25), "along the coin support track" should be in italics.

Signed and Sealed this

Seventh Day of September 1976

[SEAL]

*Attest:*

RUTH C. MASON
*Attesting Officer*

C. MARSHALL DANN
*Commissioner of Patents and Trademarks*